(12) United States Patent
Gomez

(10) Patent No.: US 11,816,546 B2
(45) Date of Patent: *Nov. 14, 2023

(54) FAIRNESS AND OUTPUT AUTHENTICITY FOR SECURE DISTRIBUTED MACHINE LEARNING

(71) Applicant: SAP SE, Walldorf (DE)

(72) Inventor: Laurent Y. Gomez, Le Cannet (FR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,751

(22) Filed: Nov. 9, 2022

(65) Prior Publication Data

US 2023/0137724 A1 May 4, 2023

Related U.S. Application Data

(63) Continuation of application No. 16/701,955, filed on Dec. 3, 2019, now Pat. No. 11,507,883.

(51) Int. Cl.
| | | |
|---|---|---|
| *G06F 21/60* | (2013.01) | |
| *G06N 20/00* | (2019.01) | |
| *G06N 3/02* | (2006.01) | |

(52) U.S. Cl.
CPC ........... *G06N 20/00* (2019.01); *G06F 21/602* (2013.01); *G06N 3/02* (2013.01)

(58) Field of Classification Search
CPC ......... G06N 20/00; G06N 3/02; G06F 21/602
See application file for complete search history.

(56) References Cited

U.S. PATENT DOCUMENTS

| | | | |
|---|---|---|---|
| 11,222,138 B2 * | 1/2022 | Mohassel | A63B 21/023 |
| 11,328,087 B1 | 5/2022 | Allen et al. | |
| 2014/0365781 A1 * | 12/2014 | Dmitrienko | G06F 21/34 |
| | | | 713/185 |
| 2016/0020898 A1 * | 1/2016 | Nikolaenko | G09C 1/00 |
| | | | 713/168 |
| 2019/0244087 A1 * | 8/2019 | Park | G06N 3/045 |
| 2020/0242466 A1 * | 7/2020 | Mohassel | H04L 9/008 |
| 2020/0280551 A1 * | 9/2020 | Wallrabenstein | H04L 63/0428 |
| 2020/0356085 A1 * | 11/2020 | Wentz | H04L 9/0866 |
| 2020/0366459 A1 * | 11/2020 | Nandakumar | H04L 9/008 |
| 2020/0389304 A1 * | 12/2020 | Gryb | H04L 9/0894 |
| 2020/0402625 A1 * | 12/2020 | Aravamudan | G06F 21/602 |
| 2020/0410404 A1 * | 12/2020 | Imani | H04L 9/085 |
| 2021/0012013 A1 * | 1/2021 | Gourisetti | G06F 16/27 |
| 2021/0081807 A1 * | 3/2021 | Tueno | H04L 9/0656 |
| 2021/0083841 A1 * | 3/2021 | Tueno | H04L 9/0618 |
| 2021/0091952 A1 * | 3/2021 | Wentz | H01L 23/573 |
| 2021/0133587 A1 * | 5/2021 | Mohassel | G06F 18/24137 |

(Continued)

OTHER PUBLICATIONS

"U.S. Appl. No. 16/701,955, Notice of Allowance dated Jul. 20, 2022", 12 pgs.

(Continued)

*Primary Examiner* — Stephen T Gundry
(74) *Attorney, Agent, or Firm* — SCHWEGMAN LUNDBERG & WOESSNER, P.A.

(57) ABSTRACT

Fairness and output authenticity for secure distributed machine learning is provided by way of an encrypted output of a garbled circuit which is simultaneously provided to a garbler and an evaluator by an output discloser. Related systems, methods and articles of manufacture are also disclosed.

20 Claims, 11 Drawing Sheets

(56) References Cited

U.S. PATENT DOCUMENTS

| | | | |
|---|---|---|---|
| 2021/0135837 A1* | 5/2021 | Cheung | H04L 9/008 |
| 2021/0144127 A1* | 5/2021 | Veeningen | H04L 9/00 |
| 2021/0150037 A1* | 5/2021 | Radhakrishnan | G06N 3/08 |
| 2021/0166152 A1 | 6/2021 | Gomez | |
| 2021/0203484 A1 | 7/2021 | Veeningen et al. | |
| 2021/0209247 A1 | 7/2021 | Mohassel et al. | |
| 2021/0248268 A1 | 8/2021 | Ardhanari et al. | |
| 2021/0273784 A1 | 9/2021 | Gryb et al. | |
| 2021/0399898 A1 | 12/2021 | Wright et al. | |
| 2022/0012358 A1 | 1/2022 | Gaddam et al. | |
| 2022/0012672 A1 | 1/2022 | Inman et al. | |
| 2022/0083865 A1* | 3/2022 | Riazi | G06F 21/71 |
| 2022/0092216 A1 | 3/2022 | Mohassel et al. | |

OTHER PUBLICATIONS

"Garbled circuit", Wikipedia: The Free Encyclopedia, Wikimedia Foundation, Inc, <https://enwikipedia.org/wiki/Garbled_circuit>, (Dec. 6, 2019), 7 pgs.

"Garbled circuits: How can the sender safely retrieve the output?", Cryptography Stack Exchange, <https://crypto.stackexchange.com/questions/47713/garbled-circuits-how-can-the-senderafely-retrieve-the-output>, (2017), 2 pgs.

"General Data Protection Regulation", Wikipedia: The Free Encyclopedia, Wikimedia Foundation, Inc, <https://en.wikipedia.org/wiki/General_Data_Protection_Regulation>, (Dec. 6, 2019), 17 pgs.

"Known-plaintext attack", Wikipedia: The Free Encyclopedia, Wikimedia Foundation, Inc., <hllps://en.wikipedia.org/wiki/Known-plaintext_attack>, (Dec. 6, 2019), 3 pgs.

"Oblivious transfer", Wikipedia: The Free Encyclopedia, Wikimedia Foundation, Inc, <hllps://en.wikipedia.org/wiki/Oblivious_transfer>, (Dec. 6, 2019), 6 pgs.

Bellare, et al., "Foundation of Garbled Circuits", CCS 2012: Proceedings of the 2012 ACM Conference on Computer and Communications Security, (Oct. 1, 2012), 1-43.

Courbariaux, Matthieu, et al., "Binarized Neural Networks: Training Deep Neural Networks with Weights and Activations Constrained to +1 or −1", Cornell University:arXiv, (2016), 11 pgs.

Gomez, et al., "Intellectual Property Protection for Distributed Neural Networks: Towards Confidentiality of Data, Model, and Inference", ICETE 2018: E-Business and Telecommunications, SECRYPT 2018: International Conference on Security and Cryptography, (2018), 147-154.

Kilinc, et al., "Efficiently Making Secure Two-Party Computation Fair", FC 2016: Financial Cryptography and Data Security, (2017), 1-20.

Kolesnikov, et al., "Improved Garbled Circuit: Free XOR Gates and Applications", ICALP 2008: Automata Languages and Programming, (2008), 1-12.

Pinkas, "Fair Secure Two-Party Computation", Eurocrypt 2003: Advances in Cryptology, (2003), 87-105.

Tang, et al., "Privacy-Preserving Distributed Deep Learning via Homomorphic Re-Encryption", Electronics, 8{411), (2018).

\* cited by examiner

FAIRNESS AND OUTPUT AUTHENTICITY FOR SECURE DISTRIBUTED MACHINE LEARNING

CROSS-REFERENCE TO RELATED APPLICATIONS

This application is a continuation of prior application Ser. No. 16/701,955, filed on Dec. 3, 2019, which is incorporated by reference herein in its entirety.

TECHNICAL FIELD

The subject matter described herein relates to enhanced security properties of cryptographic techniques/schemes in distributed machine learning computing environments.

BACKGROUND

Distributed artificial intelligence-based software is increasingly being adopted in order to leverage significant computing resources available, for example, in the cloud. However, such arrangements pose increased security risks associated with the transfer of data as well as the potential model leakage/insight. Moreover, data regulations such as GDPR mandate how data needs to be handled. As such, increased emphasis is being focused on the protection of input and output data for distributed computing systems incorporating artificial intelligence.

SUMMARY

In a first aspect involving a garbled circuit having a garbler and an evaluator, the garbler assigns random input and output labels to a logical circuit. The garbler then generates a garbled table comprising an encryption of the output labels with their respective inputs as symmetric keys. The garbler later sends the garbled table to an evaluator. The garbler additionally generates an output discloser table that maps each randomized output label with a corresponding output value, encrypted with a pre-shared key k. The garbler sends the output discloser table to an output discloser along with the key k. The garbler later provides a randomized input label for the evaluator in response to a request from the evaluator. The evaluator evaluates the logical circuit by decrypting each entry from the garbled table with the garbler and evaluator respective randomized input labels After the evaluating, the evaluator sends a randomized output label to the garbler and to the output discloser. The garbler sends a mapping output value to the evaluator. The output discloser extracts a matching encrypted output with the key k. The output discloser subsequently simultaneously sends the encrypted output to the garbler and the evaluator which can be decrypted using key k.

The output labels can be symmetrically encrypted in the garbled table.

Each randomized output label mapped with the corresponding output value can be symmetrically encrypted with the pre-shared key k. The output values can be padded with a random value prior to the symmetric encryption to prevent a plain-text attack.

The evaluating can include evaluating a logical gate without disclosing the randomized label inputs from the garbler and the randomized label inputs of the evaluator. The logical gate can be a Boolean gate.

The evaluator can execute at least one machine learning model as part of the evaluating. The machine learning model can take various forms including a neural network.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the use of garbled circuit (GC) technologies while, at the same time, providing fairness at the output decryption for both of the data owner and the model owner.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for using a garbled circuit in connection with distributed machine learning architectures.

Figure 1:
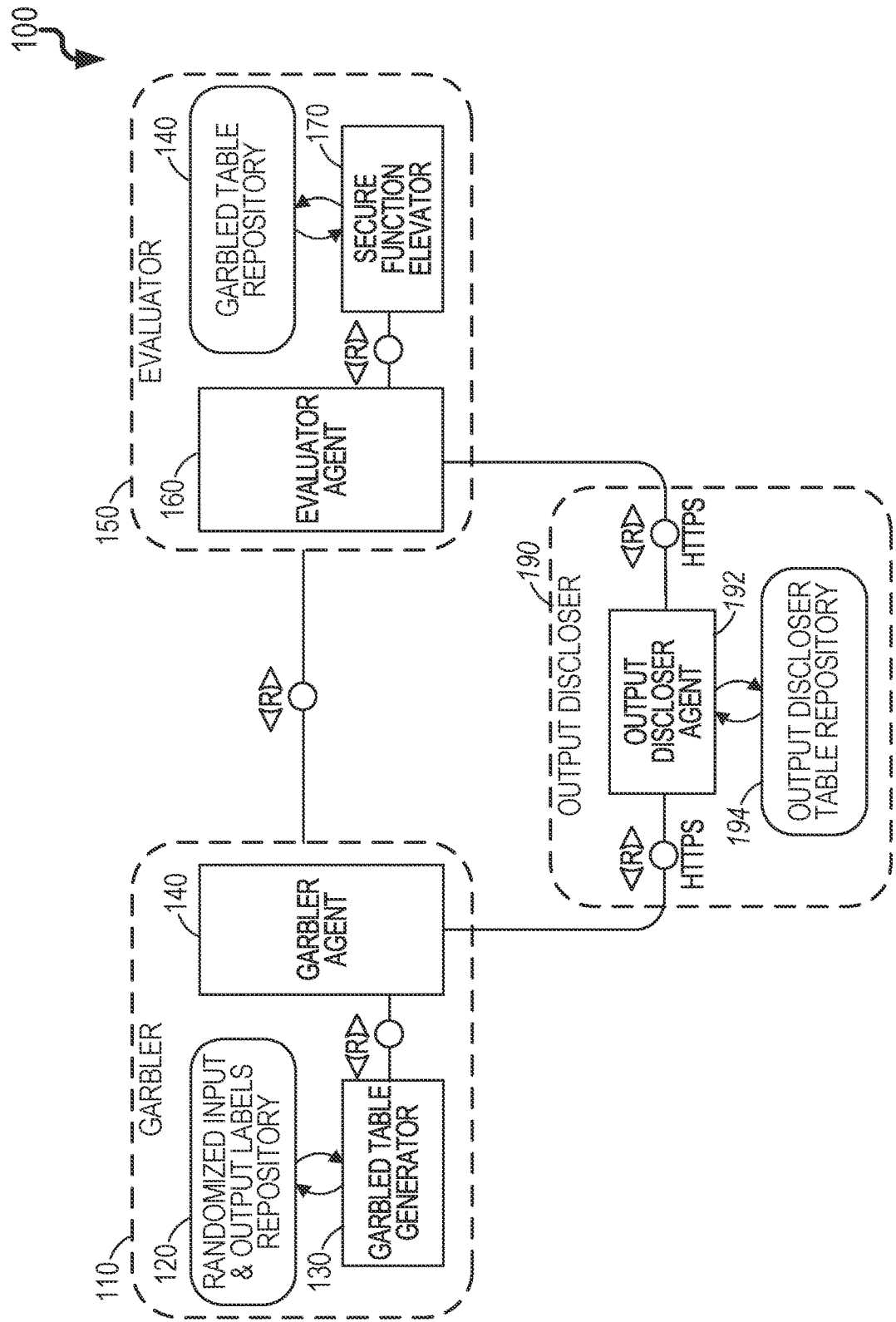
FIG. 1 is a diagram illustrating a garbled circuit architecture.

With reference to diagram 100 of FIG. 1, a garbled circuit architecture (sometimes referred to simply as a garbled circuit) can comprise two main components, namely a garbler 110 and an evaluator 140. A garbled circuit is a cryptographic protocol that enables two-party secure computation in which two mistrusting parties evaluate a function f over their private inputs, without disclosing their respective inputs. In this protocol, the function f has to be described as a Boolean circuit, or logic gate (e.g., AND, OR, NOT, ADDER, MUX). The garbler 110 can include a garbled table generator 130 that utilizes data from a randomized input and output labels repository 110. The tables generated by the garbled table generator 130 can be transmitted to the evaluator via a garbler agent 140. The evaluator 150, in turn, can include an evaluator agent 160 to receive the table so that a secure function evaluator 180 can assess the table using a garbled table repository 170. The architecture of FIG. 1 also includes an output discloser 190 having an output discloser agent 192 which can communicate with the garbler agent 140 and the evaluator agent 160. The output disclosure 190 can include a repository 194 in which an output discloser table can be stored (as described in further detail).

Referring again to FIG. 1, the garbler 110 can initiate the garbled circuit protocol by encrypting the inputs and outputs label of a Boolean Circuit. The garbler 110 can then send the garbled circuit, together with its encrypted input, to the evaluator 140. Thereafter, through a oblivious-transfer technique, the evaluator 150 can retrieve its encrypted inputs from the garbler 110, without disclosing the inputs to the garbler 110. Next, the evaluator 140 can then evaluate the garbled circuit based on the encrypted inputs. The result of the evaluation is an encrypted output, to be decrypted by the garbler 110 or the evaluator 150.

Figure 2:
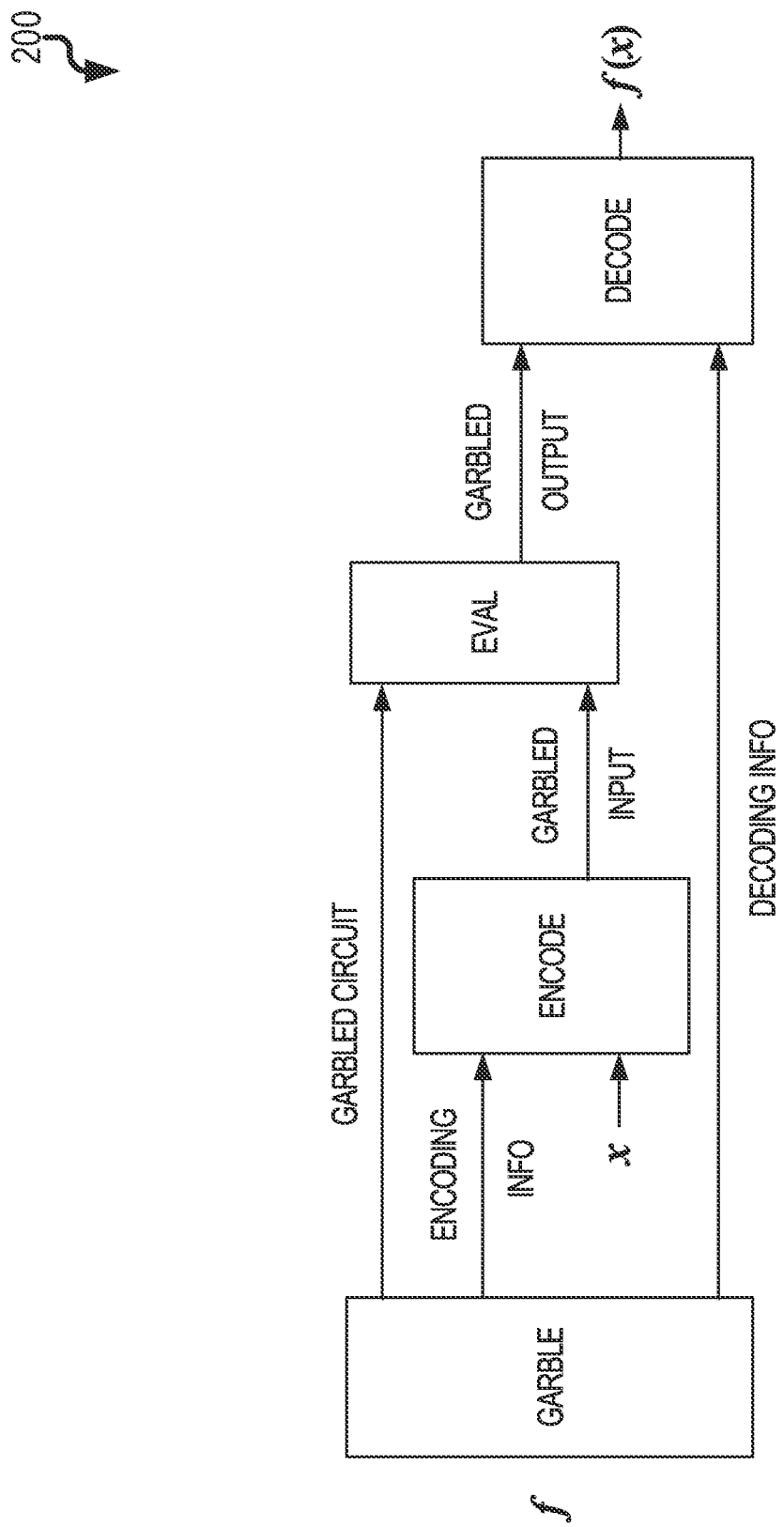
FIG. 2 is a diagram illustrating an example garbled circuit.

FIG. 2 is a diagram 200 illustrating a sample garbled circuit. A function f is described as a Boolean circuit with 2-input gates. The circuit is known by two parties identified as the garbler and the evaluator. The garbler encrypts the circuit (see garble component) and sends the garbled circuit to the evaluator. The garbler encodes its inputs in the encode component and sends it to the evaluator. The Boolean circuit is evaluated by the evaluator in the eval component and generates a garbled output. The latter is decoded in the Decode component.

With the current subject matter, depending on the utilized garbled circuit protocol implementation, output decryption can be performed either by the evaluator 150 or the garbler 110. The evaluator 150 sends the encrypted output to the garbler 110 for decryption. The garbler 110 sends back the decrypted value to the evaluator 150.

In some variations, the garbled circuit can include a Free-XOR, which enables the evaluator 150 to decrypt the output on its own. The garbler 110 later receives the decrypted output from the evaluator 150.

Regardless of the selected option, the garbed circuit protocol can assume that the output decryptor is fair, meaning that it does not withhold decrypted output from its counterpart in the protocol. In addition, the decryptor can be expected to guarantee output authenticity, delivering the correct decrypted output to its counterpart, without any modification.

Nevertheless, fairness and output authenticity are still of out of the scope of conventional garbled circuit techniques. When applied to distributed machine learning, it raises the question of fair output sharing between the data and machine learning model owners. Each party aims at getting access to the decrypted output simultaneously.

Garbled circuits can be used in the field of machine learning to achieve security of Binarized Neural Networks. While lowering the impact on memory consumption and computation time, Binarized Neural Networks foster the adoption of distributed machine learning-based software on decentralized systems. Binarization of neural networks can include translation of a classical neural network into a Boolean circuit, where weights and activation function are binarized. In that context, a garbled circuit can be used to guarantee data confidentiality (input and output) and to safeguard intellectual property of the deployed model. In some cases, the intellectual property of the neural network model lies in its parametrization (e.g. weights, biases), rather than in its topology, which can be shared between the data and model owner.

Distribution of machine learning-based software raises major security concerns: protection of input and output data, together with the safeguarding of model intellectual property. Independent software vendors aim to protect both: data and the intellectual property of their AI-based software assets, deployed on potentially unsecure edge hardware and platforms. The deployment of data processing capabilities throughout distributed enterprise systems raises several security challenges related to the protection of input and output data as well as of software assets.

The following is a use case example of how a smart city can utilize machine learning-based video surveillance. Nowadays, cities are equipped with video surveillance infrastructure, where video stream is manually monitored and analyzed by police officers. This analysis is time-consuming, costly and with questionable efficiency. Thus, cameras end up being used a posteriori to review incident footage. Indeed, smart cities are increasingly relying on a video protection infrastructure to improve early detection of incidents in public spaces (e.g., early detection of terrorist attacks, abnormal crowd movement).

By empowering cameras with deep learning capabilities on the edge, cameras evolve into multi-function sensors. This way, cameras can provide analytics and feedback, shifting towards a smart city cockpit. With such approach, video management moves from sole protection to versatile monitoring. These cameras have not only a simple, but essential, security role; they can also measure in real time the pulse of the agglomeration throughout vehicle flows and people who use them to redefine mobility, reduce public lighting costs, smooth traffic flow, and the like.

In this example, the smart city owns the video stream (data owner), while a third party ISV owns the intellectual property of the deployed neural network for object detection (model owner) on video surveillance cameras. Each party requires guarantees on output authenticity and fairness. Such neural network can be binarized and secured with a garbled circuit. As a drawback, one of the parties might have first access to the decrypted output, while the other party may have to rely on the first party for fairly sharing the output.

With the current subject matter, techniques are provided to enable two parties involved in a garbled circuit to disclose the output data simultaneously. This arrangement addresses the fairness problem of Yao's garbled Circuit, where one of the parties has access first on the output, and the second relies on its fairness to share the decrypted output. In particular, a third semi-honest party can be provided (referred to herein as an "output discloser").

As provided herein, with a semi-honest model, the involved parties each follow the exact same pre-specified protocol, which implies that they cannot change their inputs or outputs. In this context, it is assumed that corrupted parties merely cooperate to gather information out of the protocol, but do not deviate from the protocol specification.

Figure 3:
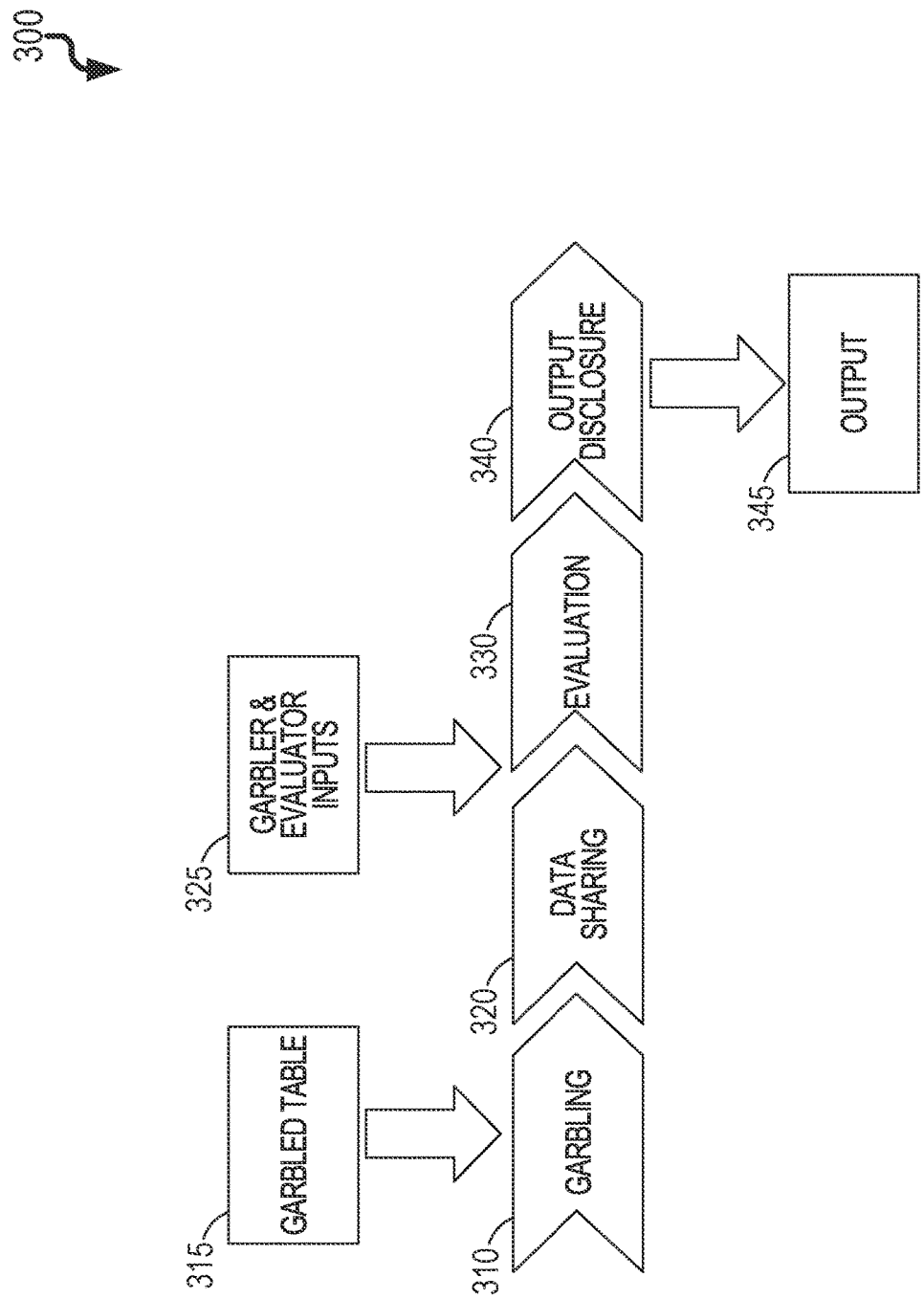
FIG. 3 is a sample workflow for a process providing fairness and output authenticity for secure distributed machine learning.

Diagram 300 of FIG. 3 illustrates an overall process that can be, based, for example, around Yao's garbled circuit steps. Two entities are involved in the garbled circuit protocol: a garbler 110, and an evaluator 150. The security property achieved by the garbled circuit is the evaluation of a given Boolean Gate ⊙, without disclosing garbler and evaluator inputs.

Figure 5:
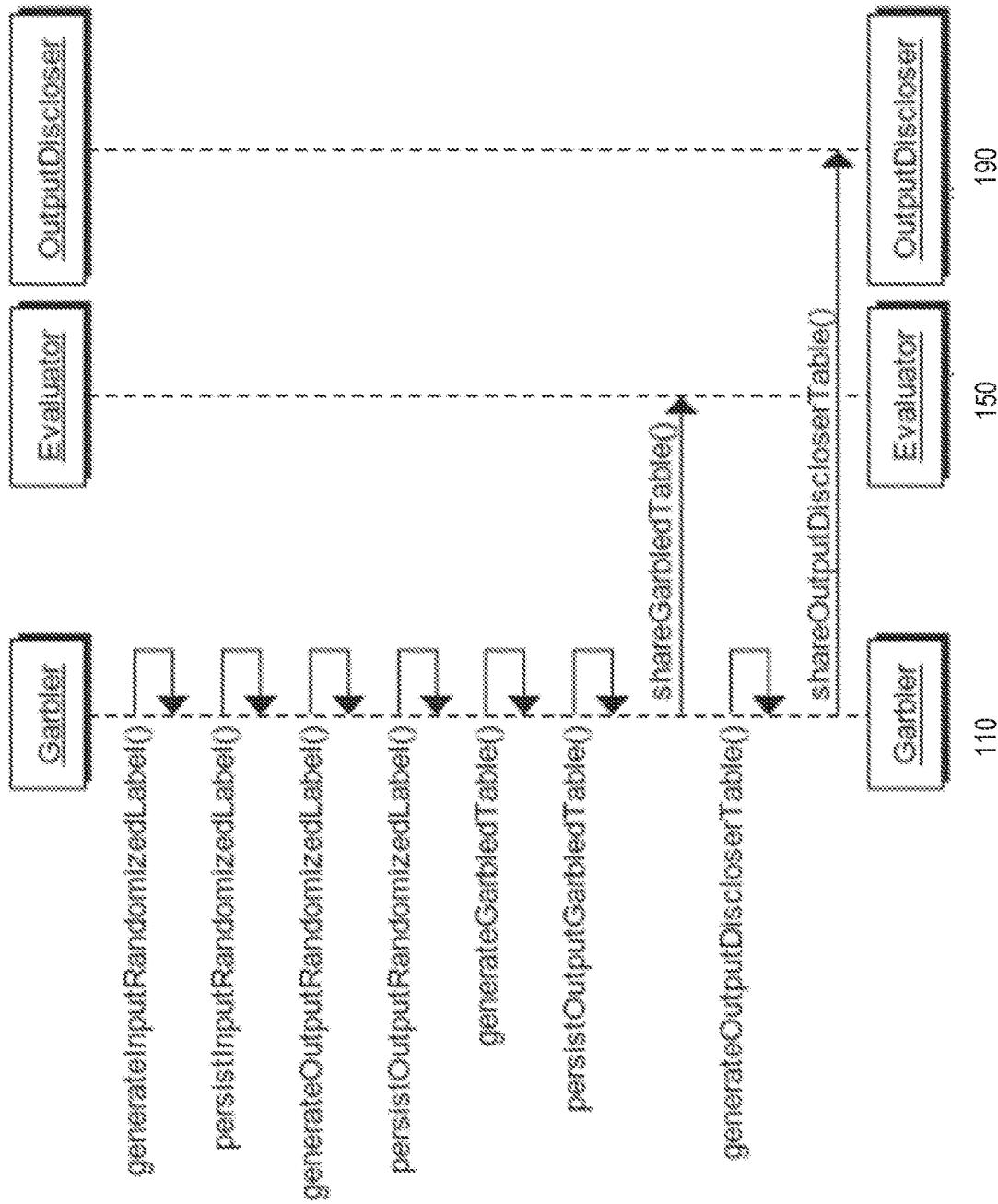
FIG. 5 is a diagram illustrating signaling during a garbling stage as illustrated in FIG. 3.

As part of a garbling stage 310, the garbler 110 assigns randomized label to inputs and outputs. The garbler 110 then generates a garbled table 315 to be shared with the evaluator 150. Further information regarding the data exchange during the garbling stage 310 is shown in diagram 500 of FIG. 5.

Figure 7:
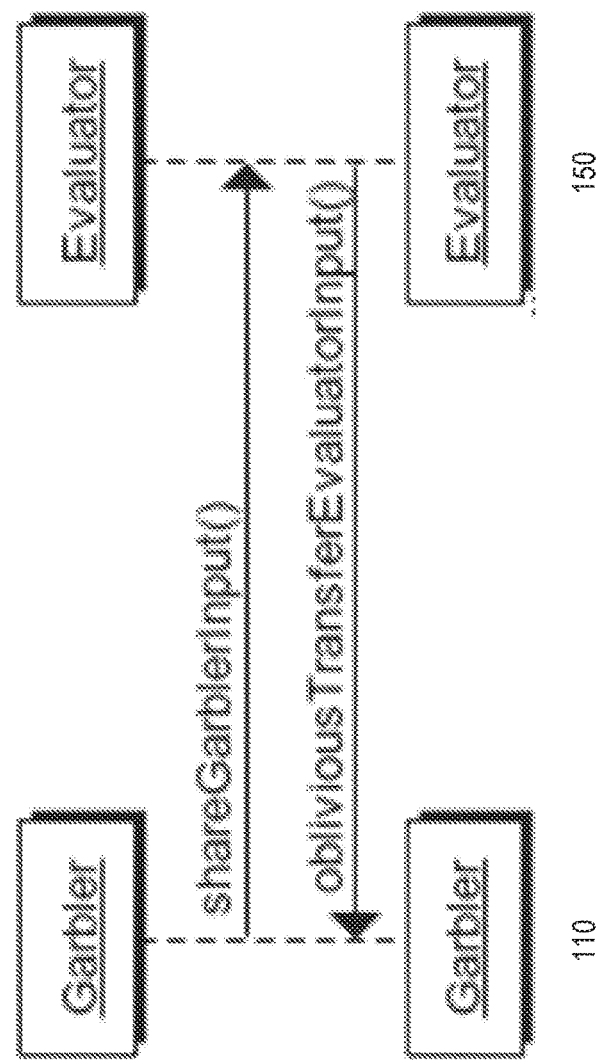
FIG. 7 is a diagram illustrating signaling during a data sharing stage as illustrated in FIG. 3.

As part of a data sharing stage 320, the evaluator 140 receives the randomized label garbler's inputs, and requests its input 325 to the garbler 110, through a 1-2 Oblivious Transfer protocol, without revealing the inputs used in the evaluation of the Boolean gate. Further information regarding the data exchange during the data sharing stage 320 is shown in diagram 700 of FIG. 7.

Figure 8:
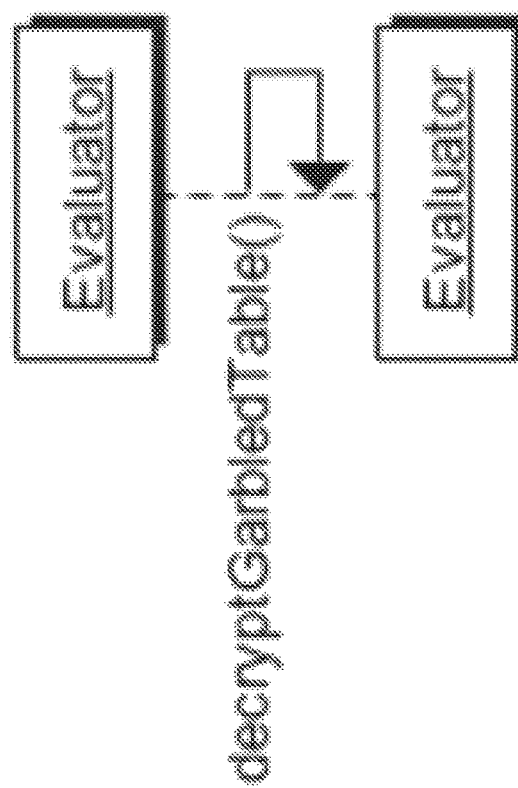
FIG. 8 is a diagram illustrating signaling during an evaluation stage as illustrated in FIG. 3.

At an evaluation stage 330, using its inputs and garbler inputs, the evaluator 110 evaluates the logical gate to get a randomized output label. Further information regarding the data exchange during the evaluation stage 330 is shown in diagram 800 of FIG. 8.

Figure 9:
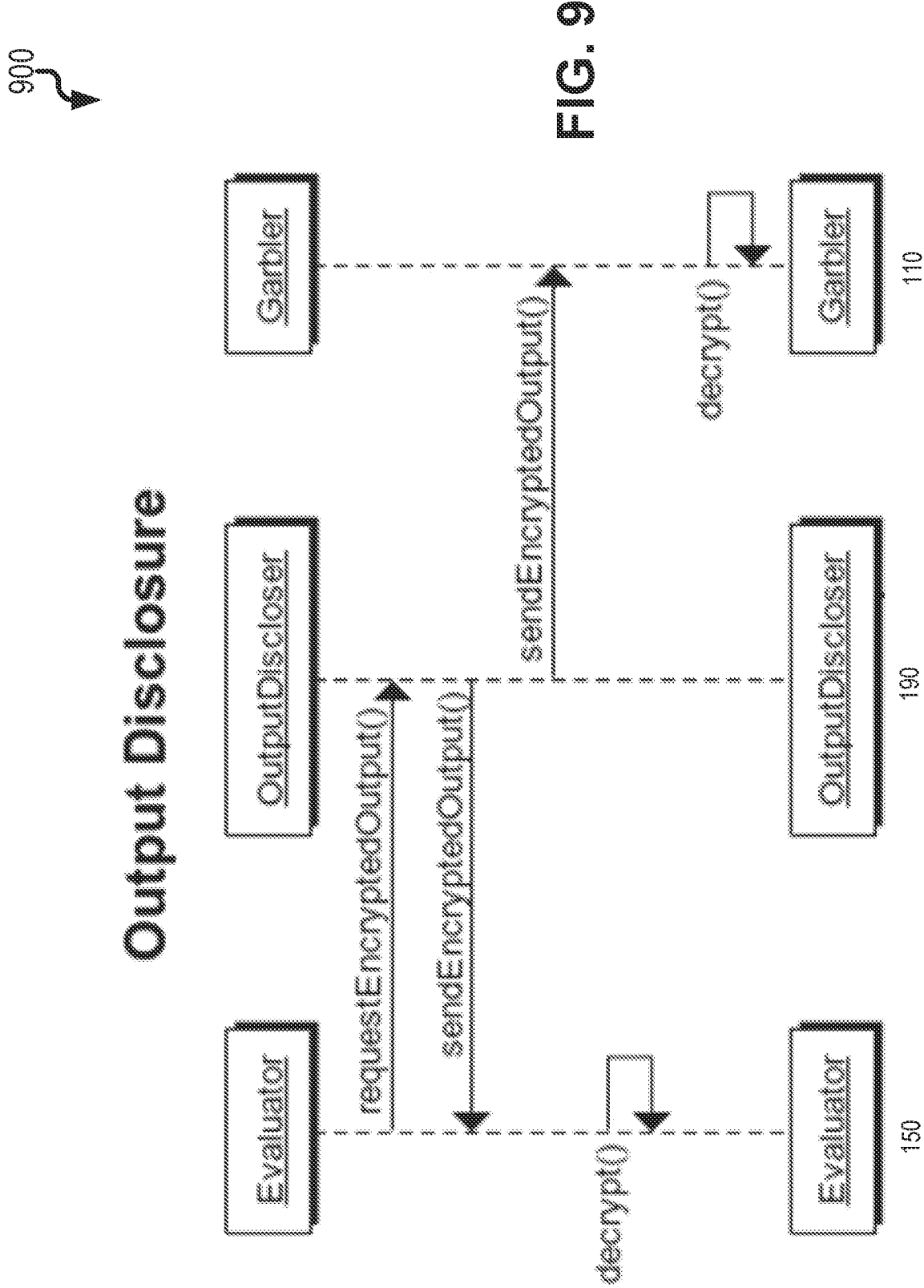
FIG. 9 is a diagram illustrating signaling during an output disclosure stage as illustrated in FIG. 3.

As part of an output disclosure stage 340, to guarantee the fairness of the output disclosure, a third trusted party (i.e., a computing system that can communication with both the garbler 110 and the evaluator 150) is involved. This third trusted party (i.e., output discloser) maintains a mapping table between the randomized output labels and an encrypted value of the logical gate evaluation. On request, the output discloser communicates simultaneously the encrypted value of the output 345 to the garbler 110 and to the evaluator 150. Further information regarding the data exchange during the output disclosure stage 340 is shown in diagram 900 of FIG. 9.

Figure 4:
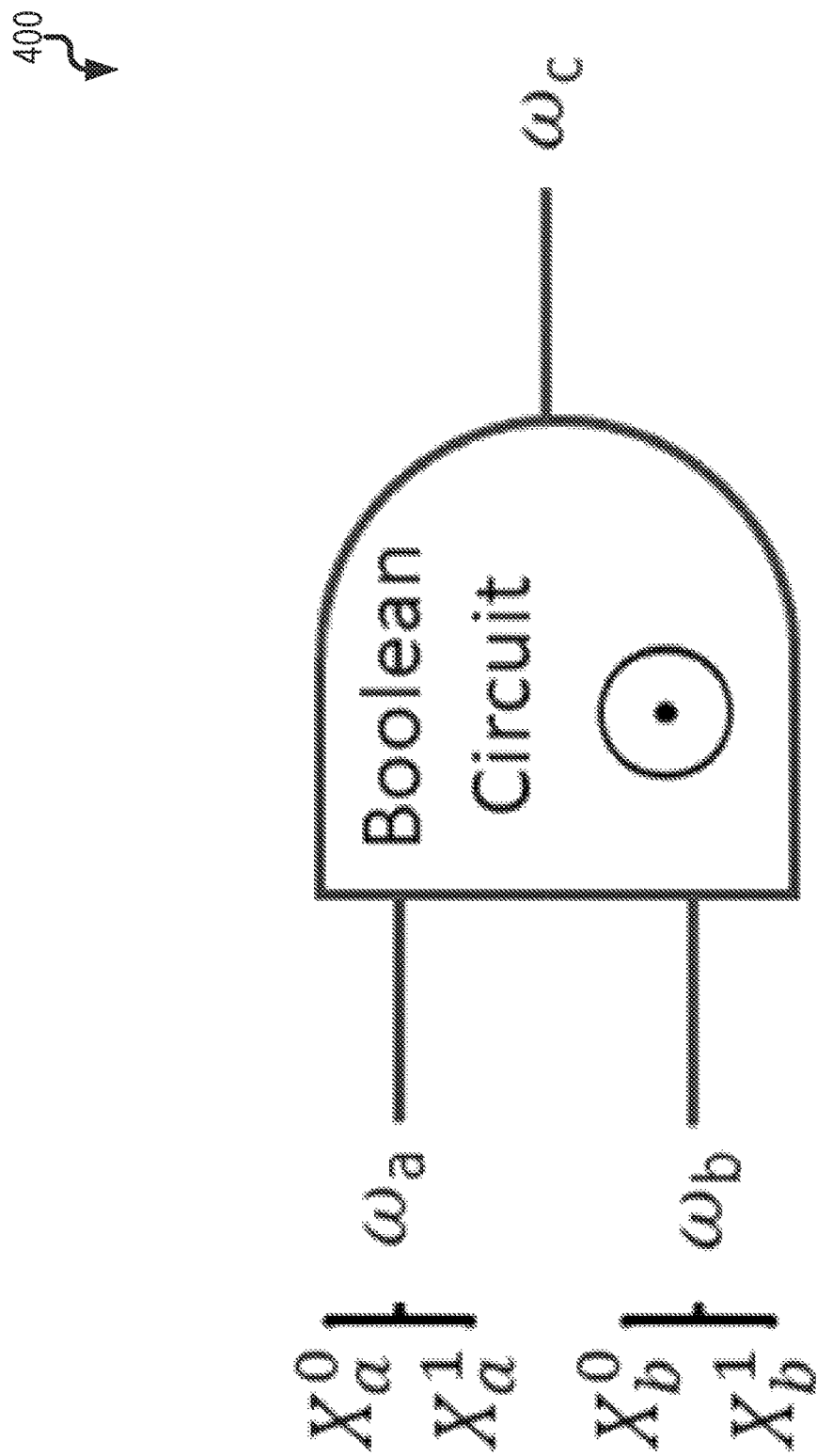
FIG. 4 is a diagram of a logical circuit to be used by an evaluator forming part of garbled circuit.

Referring again to the garbling stage 310, following the garbled Circuit as introduced by Yao, the garbler 110 encrypts the Boolean circuit, meaning the inputs and outputs. As depicted in diagram 400 of FIG. 4 and in Table 1, inputs $\omega_a$, $\omega_b$ and outputs $\omega_c$ are assigned to randomized label $X_a^{0|1}$, $X_b^{0|1}$ and $X_c^{0|1}$. From those labels, the garbler 110 generates a garbled table 315 (see Table 2) containing a symmetric encryption of all output labels, with their respective two inputs as symmetric keys.

TABLE 1

Input and Output Label Randomization

| $\omega_a$ | $\omega_b$ | $\omega_c$ |
|---|---|---|
| $X_a^0$ | $X_b^0$ | $X_c^0 \| X_c^1$ |
| $X_a^0$ | $X_b^1$ | $X_c^0 \| X_c^1$ |
| $X_a^1$ | $X_b^0$ | $X_c^0 \| X_c^1$ |
| $X_a^1$ | $X_b^1$ | $X_c^0 \| X_c^1$ |

TABLE 2

Shuffled Garbled Table $Enc_{X_b^1, X_b^1}(X_c^0 | X_c^1)$
$Enc_{X_b^1, X_b^0}(X_c^0 | X_c^1)$
$Enc_{X_b^0, X_b^0}(X_c^0 | X_c^1)$
$Enc_{X_b^0, X_b^1}(X_c^0 | X_c^1)$ The garbled table 315 is permuted and sent to the evaluator 150.

Figure 6:
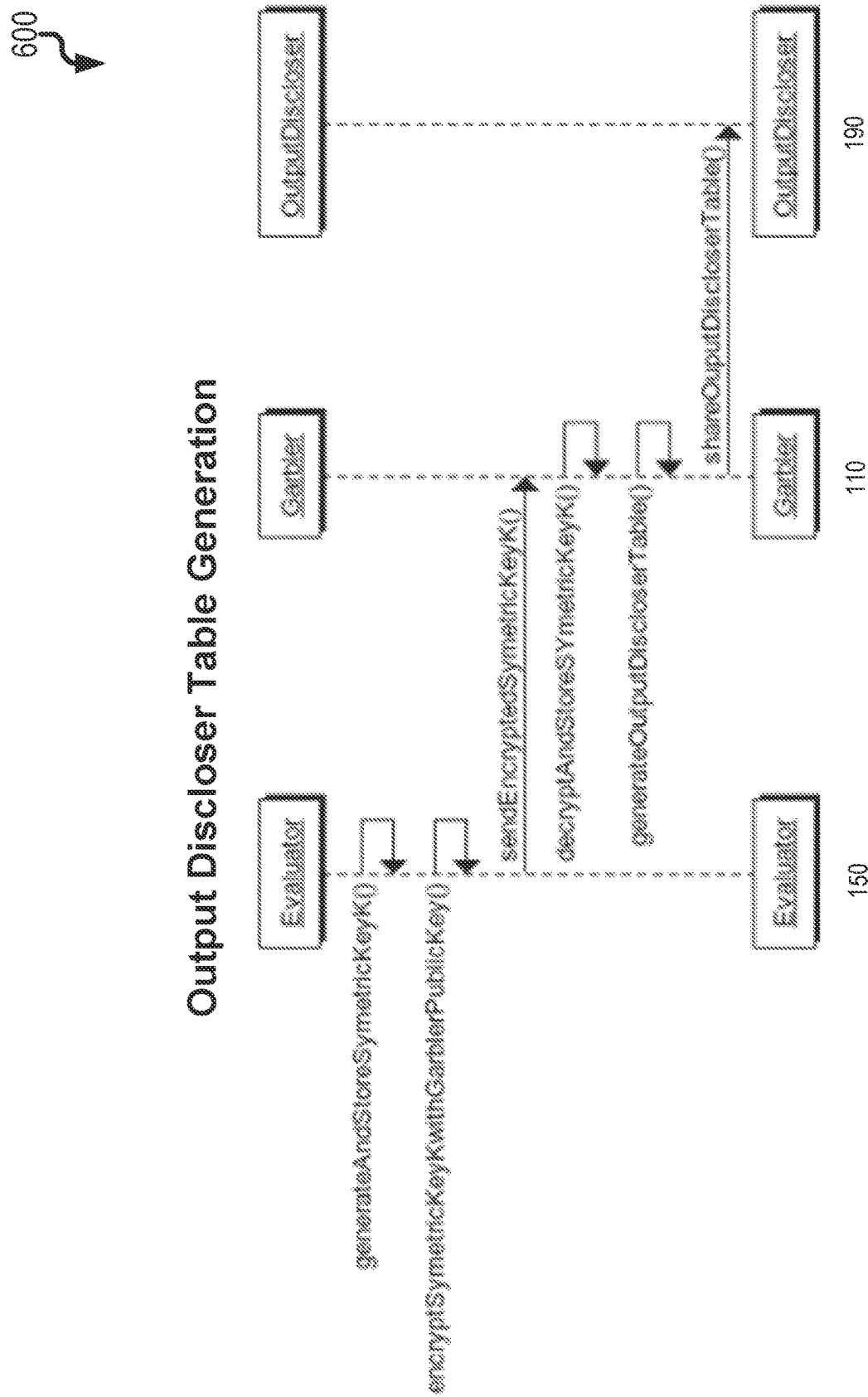
FIG. 6 is a diagram illustrating signaling to generate an output disclosure table as illustrated in FIG. 3.

In addition to the original garbled circuit approach, the garbler 150 can generate an output discloser table (see Table 3 and diagram 600 of FIG. 6), to be shared with the output discloser. This table maps each randomized output labels with their output value, encrypted symmetrically with a pre-shared key k. Before encryption, the output value is padded with a random value to prevent a known plain-text attack. The output discloser table is sent to the output discloser.

This symmetric key, generated by the evaluator 150, is exchanged with the garbler 110 along a secure channel. The asymmetric key pair of the garbler 110 can be used for the 1-2 Oblivious Transfer.

With the shared output discloser table, the garbler 110 does not disclose any confidential information to the output discloser, as the mapping output to the randomized label are encrypted with symmetric key k, only shared between the garbler 110 and the evaluator 150. Alternatively, this table can contain an endpoint address of the garbler 110 for further communication of the encrypted output.

TABLE 3

Output Discloser Table

| Randomized Output Label | Encrypted Mapping | Garbler Endpoint |
|---|---|---|
| $X_c^0$ | $Enc_k(rand_0\|\|0)$ | GarblerEndPoint |
| $X_c^1$ | $Enc_k(rand_0\|\|1)$ | GarblerEndPoint |

In the data sharing stage 320, the garbler 110 send its randomized input label to the evaluator 150 for Boolean Circuit evaluation. The evaluator 150 requests its randomized label input to the garbler 110, through, for example, an 1-2 Oblivious Transfer. This process enables the evaluator 150 to retrieve its input, as randomized label, without disclosing it to the garbler 110.

In the evaluation stage 330, the evaluator 150 can evaluate the Boolean function, by decrypting each entry from the garbled table 315 with the garbler 110 and evaluator 150 respective randomized input labels.

At this evaluation stage 330, different strategies have been proposed to identify the entry in the garbled table 315 to be decrypted. The evaluator 150 can decrypt the correct randomized output label. Once decrypted, the evaluator 150 can share the randomized output label with the garbler 110. The garbler 110 can share the mapping output value with the evaluator 150.

In the output information disclosure stage 340, the evaluator 110 sends the obtained randomized output label to the output evaluator 190.

The latter extracts from the output discloser table 345 the matching encrypted output with the symmetric key k shared by the garbler 110 and the evaluator 150.

The output evaluator 190 sends simultaneously the encrypted output to the garbler 110 and the evaluator 150. The garbler 110 and the evaluator 150 decrypts the output value with their shared secret k, and extracts the last significant bit.

The overhead of the current approach is that it only resides only the interaction with the TTP. With regard to the encrypted output table exchange, generation of a symmetric key k for the generation of the encrypted output table is required. The key k must be exchanged between the garbler 110 and evaluator 150. The garbler asymmetric cryptographic public key can be used for the oblivious transfer protocol. The garbler 110 has to exchange the encrypted output table with the output discloser 190 which can persists this table.

With regard to the encrypted output request, once the function is evaluated by the evaluator 110, it requests the associated encrypted output from the output discloser 190. The encrypted output is sent both to the garbler 110 and to the evaluator 150 for decryption with the pre-shared key k.

Figure 10:
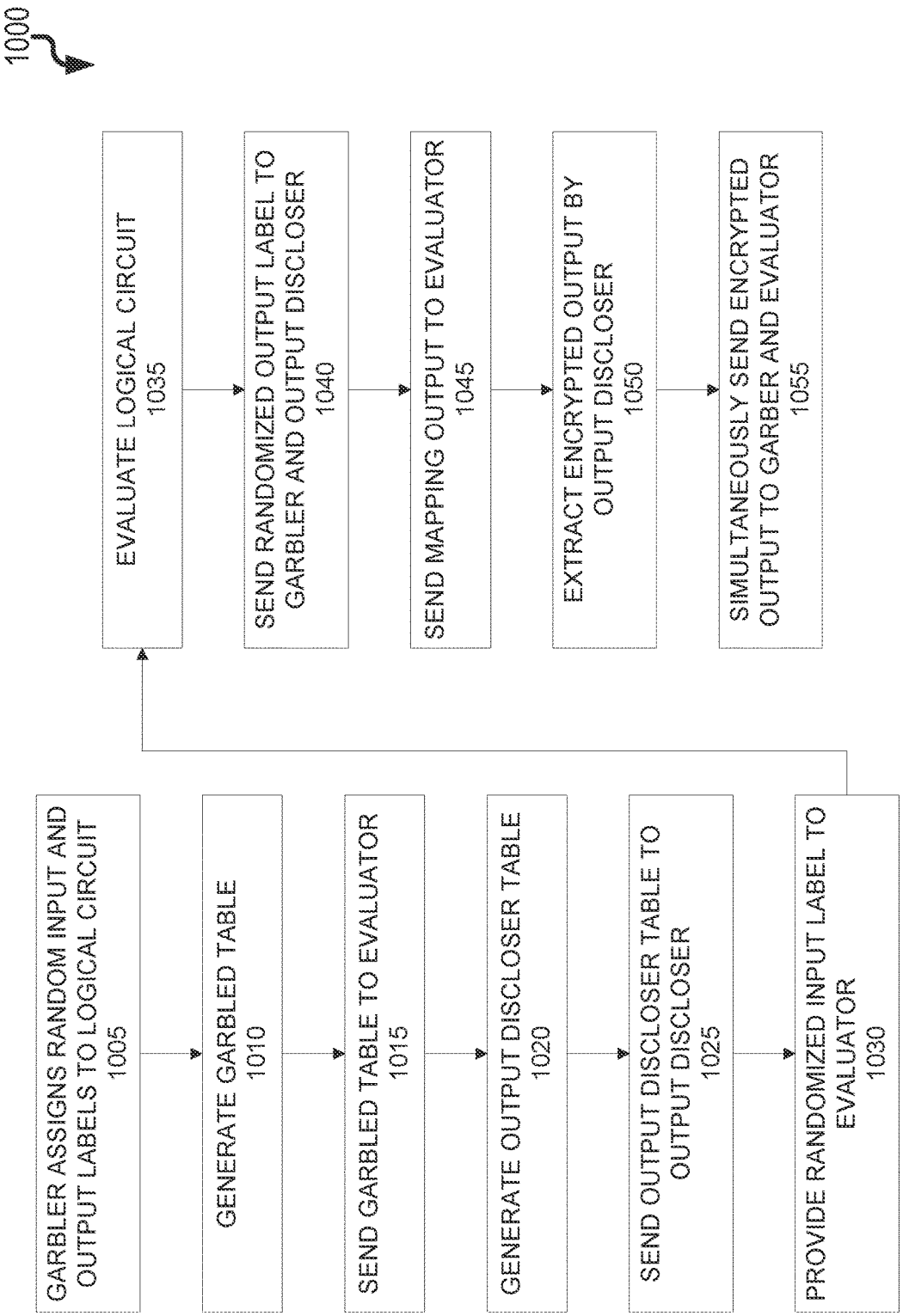
FIG. 10 is a process flow diagram illustrating fairness and output authenticity for secure distributed machine learning.

FIG. 10 is a diagram 1000 illustrating a process involving a garbled circuit having a garbler and an evaluator. At 1005, the garbler assigns random input and output labels to a logical circuit. The garbler, at 1010, then generates a garbled table comprising an encryption of the output labels with their respective inputs as symmetric keys. The garbler later, at 1015, sends the garbled table to an evaluator. The garbler additionally generates, at 1020, an output discloser table that maps each randomized output label with a corresponding output value, encrypted with a pre-shared key k. The garbler sends, at 1025, the output discloser table to an output discloser along with the key k. The garbler later provides, at 1030, a randomized input label for the evaluator in response to a request from the evaluator. The evaluator evaluates, at 1035, the logical circuit by decrypting each entry from the garbled table with the garbler and evaluator respective randomized input labels After the evaluating, at 1040, the evaluator sends a randomized output label to the garbler and to the output discloser. The garbler then sends, at 1045, a mapping output value to the evaluator. The output discloser extracts, at 1050, a matching encrypted output with the key k. The output discloser subsequently simultaneously sends, at 1055, the encrypted output to the garbler and the evaluator which can be decrypted using key k.

Figure 11:
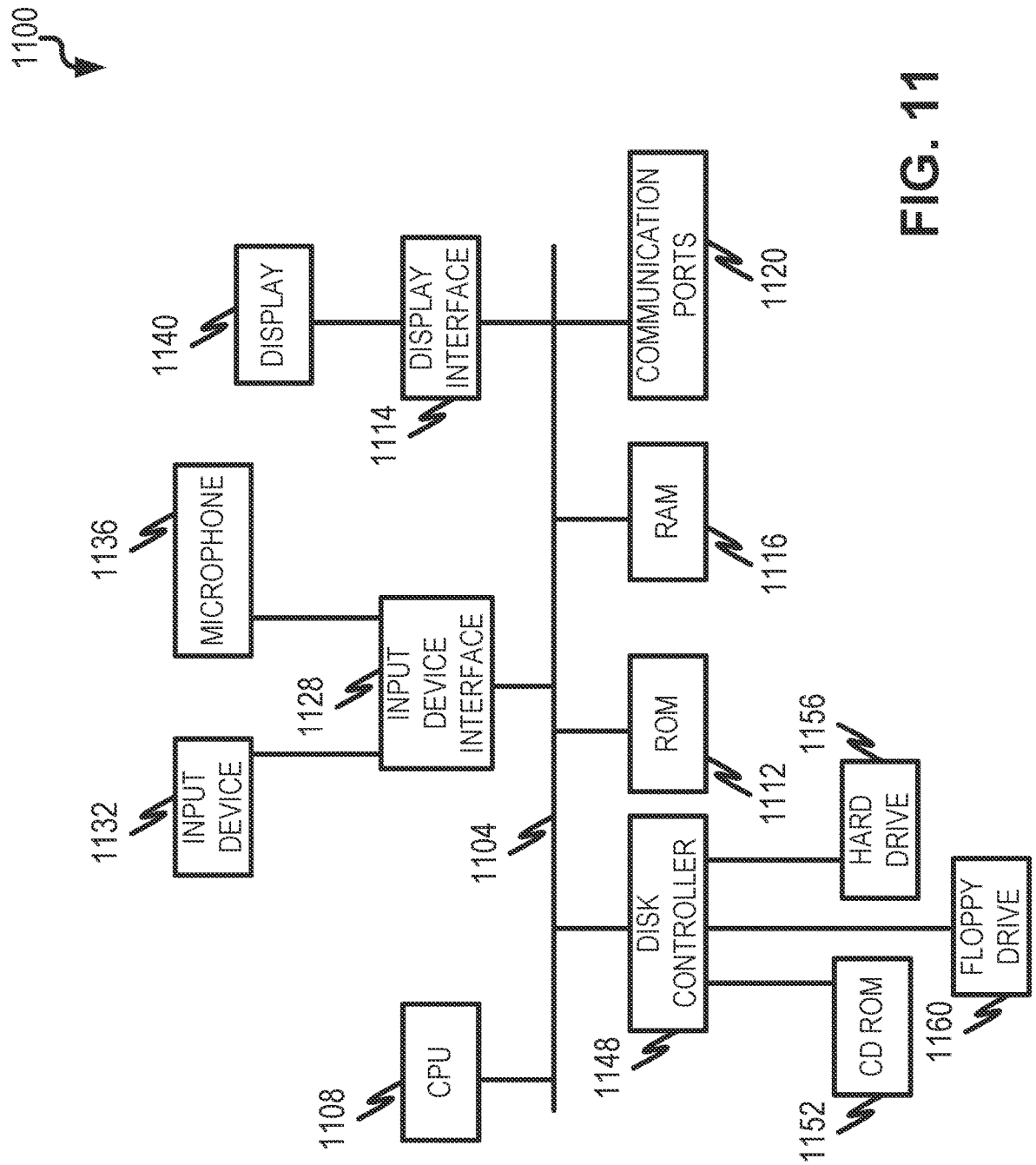
FIG. 11 is a diagram illustrating aspects of a computing device for implementing the current subject matter.

FIG. 11 is a diagram 1100 illustrating a sample computing device architecture for implementing various aspects described herein. A bus 1104 can serve as the information highway interconnecting the other illustrated components of the hardware. A processing system 1108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface with one or more optional disk drives to the system bus 1104. These disk drives can be external or internal floppy disk drives such as 1160, external or internal CD-ROM, CD-R, CD-RW or DVD, or solid state drives such as 1152, or external or internal hard drives 1156. As indicated previously, these various disk drives 1152, 1156, 1160 and disk controllers are optional devices. The system bus 1104 can also include at least one communication port 1120 to allow for communication with external devices either physically connected to the computing system or available externally through a wired or wireless network. In some cases, the at least one communication port 1120 includes or otherwise comprises a network interface.

To provide for interaction with a user, the subject matter described herein can be implemented on a computing device having a display device 1140 (e.g., a CRT (cathode ray tube) or LCD (liquid crystal display) monitor) for displaying information obtained from the bus 1104 via a display interface 1114 to the user and an input device 1132 such as keyboard and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone 1136, or tactile feedback); and input from the user can be received in any form, including acoustic, speech, or tactile input. The input device 1132 and the microphone 1136 can be coupled to and convey information via the bus 1104 by way of an input device interface 1128. Other computing devices, such as dedicated servers, can omit one or more of the display 1140 and display interface 1114, the input device 1132, the microphone 1136, and input device interface 1128.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
one or more processors; and
a non-transitory computer-readable medium storing instructions that, when executed by at least one processor among the one or more processors, cause the at least one processor to perform operations comprising:
assigning random input and output labels to a logical circuit;
generating a garbled table comprising an encryption of the output labels with their respective inputs as symmetric keys;
sending the garbled table to an evaluator;
generating an output discloser table that maps each randomized output label with a corresponding output value, encrypted with a pre-shared key k;
sending the output discloser table to an output discloser along with the key k;
providing a randomized input label for the evaluator in response to a request from the evaluator;
receiving a randomized output label from the evaluator;
sending a mapping output value to the evaluator;
receiving a matching encrypted output from the output discloser; and
decrypting the matching encrypted output using the key k.

2. The system of claim 1, wherein the output labels are symmetrically encrypted in the garbled table.

3. The system of claim 1, wherein each randomized output label mapped with the corresponding output value is symmetrically encrypted with a pre-shared key k.

4. The system of claim 3, wherein the output values are padded with a random number prior to the symmetric encryption.

5. A system comprising:
one or more processors; and
a non-transitory computer-readable medium storing instructions that, when executed by at least one processor among the one or more processors, cause the at least one processor to perform operations comprising:
receiving a garbled table from a garbler, the garbled table comprising an encryption of output labels with respective inputs as symmetric keys;
sending a request for a randomized input label to the garbler;
receiving the randomized input label from the garbler;
evaluating a logical circuit to which the output labels and respective inputs have been assigned, by decrypting each entry from the garbled table;
sending a randomized output label to the garbler and to an output discloser;
receiving a mapping output value from the garbler;
receiving encrypted output from the output discloser; and
decrypting the encrypted output using a key k.

6. The system of claim 5, wherein the evaluating comprises evaluating a logical gate without disclosing randomized label inputs from the garbler and the randomized label inputs of the evaluator.

7. The system of claim 6, wherein the logical gate is a Boolean gate.

8. The system of claim 7, wherein the evaluating executes at least one machine learning model.

9. The system of claim 8, wherein the at least one machine learning model comprises a neural network.

10. The system of claim 9, wherein the neural network is a binarized neural network.

11. A method comprising:
assigning random input and output labels to a logical circuit;
generating a garbled table comprising an encryption of the output labels with their respective inputs as symmetric keys;
sending the garbled table to an evaluator;
generating an output discloser table that maps each randomized output label with a corresponding output value, encrypted with a pre-shared key k;
sending the output discloser table to an output discloser along with the key k;
providing a randomized input label for the evaluator in response to a request from the evaluator;
receiving a randomized output label from the evaluator;
sending a mapping output value to the evaluator;
receiving a matching encrypted output from the output discloser; and
decrypting the matching encrypted output using the key k.

12. The method of claim 11, wherein the output labels are symmetrically encrypted in the garbled table.

13. The method of claim 11, wherein each randomized output label mapped with the corresponding output value is symmetrically encrypted with a pre-shared key k.

14. The method of claim 13, wherein the output values are padded with a random number prior to the symmetric encryption.

15. A method comprising:
receiving a garbled table from a garbler, the garbled table comprising an encryption of output labels with respective inputs as symmetric keys;

sending a request for a randomized input label to the garbler;

receiving the randomized input label from the garbler;

evaluating a logical circuit to which the output labels and respective inputs have been assigned, by decrypting each entry from the garbled table;

sending a randomized output label to the garbler and to an output discloser;

receiving a mapping output value from the garbler;

receiving encrypted output from the output discloser; and decrypting the encrypted output using a key k.

16. The method of claim 15, wherein the evaluating comprises evaluating a logical gate without disclosing randomized label inputs from the garbler and the randomized label inputs of the evaluator.

17. The method of claim 16, wherein the logical gate is a Boolean gate.

18. The method of claim 17, wherein the evaluator executes at least one machine learning model as part of the evaluating.

19. The method of claim 18, wherein the at least one machine learning model comprises a neural network.

20. The method of claim 19, wherein the neural network is a binarized neural network.

* * * * *